US008299183B2

(12) United States Patent
Hahn et al.

(10) Patent No.: US 8,299,183 B2
(45) Date of Patent: Oct. 30, 2012

(54) POLYMER DISPERSION AND PROCESS FOR PREPARING A POLYMER DISPERSION

(75) Inventors: Mathias Hahn, Wilhelmshorst (DE); Werner Jaeger, Kleinmachnow (DE); André Laschewsky, Potsdam (DE); Bernd Paulke, Potsdam (DE); Christian Przybyla, Duisburg (DE); Achim Sieger, Waldheim (DE)

(73) Assignees: Akzo Nobel N.V., Arnhem (NL); Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 1053 days.

(21) Appl. No.: 11/315,967

(22) Filed: Dec. 22, 2005

(65) Prior Publication Data
US 2006/0142464 A1 Jun. 29, 2006

Related U.S. Application Data

(60) Provisional application No. 60/639,469, filed on Dec. 28, 2004.

(51) Int. Cl.
C08F 271/00 (2006.01)
C08F 226/00 (2006.01)

(52) U.S. Cl. ............... 525/329.4; 524/458; 524/812; 524/815; 525/259; 525/293; 525/328.2

(58) Field of Classification Search ............ 524/458, 524/804, 812, 815; 525/278, 293, 259, 328.2, 525/329.4
See application file for complete search history.

(56) References Cited

U.S. PATENT DOCUMENTS

| 4,380,600 | A | * | 4/1983 | Hosoda et al. | 524/458 |
|---|---|---|---|---|---|
| 4,617,362 | A | | 10/1986 | Becker et al. | 526/209 |
| 4,929,655 | A | * | 5/1990 | Takeda et al. | 524/458 |
| 5,403,883 | A | * | 4/1995 | Messner et al. | 524/458 |
| 5,512,636 | A | | 4/1996 | Polizzotti et al. | 525/285 |
| 5,597,859 | A | | 1/1997 | Hurlock et al. | 524/458 |
| 5,840,804 | A | | 11/1998 | Carl et al. | 524/555 |
| 6,075,089 | A | * | 6/2000 | Jaeger et al. | 524/762 |
| 6,124,396 | A | * | 9/2000 | Hahn et al. | 524/801 |
| 6,133,363 | A | | 10/2000 | Jaeger et al. | 524/458 |
| 6,171,505 | B1 | | 1/2001 | Maury et al. | 210/727 |
| 6,238,521 | B1 | | 5/2001 | Shing et al. | 162/164.1 |
| 6,423,801 | B1 | * | 7/2002 | Hahn et al. | 526/258 |
| 7,034,068 | B1 | * | 4/2006 | Negele et al. | 524/45 |
| 7,408,004 | B2 | * | 8/2008 | Struck et al. | 524/815 |
| 2002/0188040 | A1 | * | 12/2002 | Chen et al. | 524/35 |
| 2003/0212183 | A1 | | 11/2003 | Struck et al. | 524/460 |

FOREIGN PATENT DOCUMENTS

| EP | 0 688 800 A1 | 12/1995 |
|---|---|---|
| EP | 0 831 177 A2 | 3/1998 |
| EP | 0 831 177 A3 | 3/1998 |
| GB | 2 112 005 A | 7/1983 |
| JP | 2002-129493 | 5/2002 |
| JP | 2002-212898 | 7/2002 |
| JP | 2003-096113 | 4/2003 |
| WO | WO 99/13155 A1 | 3/1999 |
| WO | WO 00/14124 A1 | 3/2000 |
| WO | WO 01/81252 A1 | 11/2001 |
| WO | WO 02/38639 A1 | 5/2002 |
| WO | WO 03/095501 A1 | 11/2003 |
| WO | WO03/097703 A1 * | 11/2003 |
| WO | WO 03/097703 A1 | 11/2003 |

OTHER PUBLICATIONS

Derwent Abstract DN 126:131804 of Jaeger et al., "Polymerization of water-soluble cationic vinyl monomers," Macromolecular Symposia (1996), vol. 111, pp. 95-106.
Patent Abstracts of Japan Translation of JP 2002-129493.
Patent Abstracts of Japan Translation of JP 2002-212898.
Patent Abstracts of Japan Translation of JP 2003-096113.
Gu, L., et al., Synthesis and flocculation performance of graft copolymer of N-vinyl formamide and poly(dimethylaminoethyl methacrylate) mthyl chloride macromonomer, Colloid & Polymer Science, 2002, 167-175, Springer-Verlag.

* cited by examiner

Primary Examiner — Liam Heincer
Assistant Examiner — Michael A Salvitti
(74) Attorney, Agent, or Firm — Robert C. Morriss

(57) ABSTRACT

The invention relates to a process for preparing an aqueous polymer dispersion comprising reacting, in the presence of a polymeric cationic co-stabilizer (A), one or more monomers (m), and a polymer (B) of a monomer mixture comprising at least one monomer (x) having a primary, secondary or tertiary amine or amide group and at least one olefinic unsaturation, and, at least one cationic monomer (y) having at least one olefinic unsaturation. The invention also relates to a polymer dispersion, a process for preparing a polymeric stabilizer (C), a polymeric stabilizer (C) and a process for producing paper.

18 Claims, No Drawings

POLYMER DISPERSION AND PROCESS FOR PREPARING A POLYMER DISPERSION

This application claims priority based on U.S. Provisional Patent Application No. 60/639,469, filed Dec. 28, 2004.

The present invention relates to a process for preparing an aqueous polymer dispersion. It also relates to a process for preparing a polymeric stabiliser, a polymeric stabiliser, an aqueous polymer dispersion, the use of the polymer dispersion and a process for producing paper.

BACKGROUND OF THE INVENTION

Aqueous dispersions of cationic polymers are, for example, used as retention aids in paper manufacturing industry. Other uses are, for example, as flocculants for treating wastewater, as thickeners, and soil improving agents. Generally, these polymer dispersions comprise a dispersed polymer and a dispersant, also called stabiliser, which is usually a polymeric dispersant. The stabiliser stabilises the polymer dispersion in such a way that the dispersed polymer is kept in a dispersed state.

These polymer dispersions are generally prepared by polymerising a reaction mixture of water-soluble monomers in the presence of a first stabiliser acting as a dispersant and a second "co-stabiliser", which acts as a precipitating agent. Finished polymer will precipitate out and form a stable polymer dispersion. By this no significant amount of inorganic salt is present.

There are a number of criteria that the polymer dispersion should fulfil to give good results in the final application and be of commercial interest. Such criteria are, for example, the process viscosity, active content, stability, good retention and dewatering properties, and easiness of preparing the polymer dispersion including preparing the dispersant. Also, criteria such as environmental and safety aspects are of importance.

By process viscosity is meant the viscosity of the reaction mixture when producing the polymer dispersion. The viscosity should be kept low and viscosity peaks should be avoided, or at least reduced as much as possible, during the production of the polymer dispersion.

There is also desirable that the final viscosity of the polymer dispersion is as low as possible for a certain polymer content for easier handling at use, e.g. pumpability.

The shelf life of the dispersion, i.e., the stability of the polymer dispersion over time, is an important property. An efficient stabiliser is needed for keeping the polymer particles stable in dispersion without settling as sediment.

A further important factor to consider is the active content, i.e., the amount of dispersed polymer in the polymer dispersion. A higher active content gives lower transportation costs and easier handling at the end-application. By using an efficient stabiliser, dispersions with a higher active content can be obtained at the same time the viscosity can be kept low. However, it may be difficult to combine a high active content with good performance in retention and dewatering in a papermaking process.

The cationic charge of a dispersed polymer affects its ability to form stable dispersions. There exist reasons for providing stable polymer dispersions with a comparatively low cationic charge. Such reasons are, for example, FDA limits of cationic monomers for certain use, cost, risk of overcharging the cellulosic suspension when used in papermaking.

During preparation of a polymer-dispersion, deposits of polymer may form and stick to the reaction vessel and stirrer. This leads to time consuming cleaning procedures of the reaction equipment.

WO03/097703 A1 discloses a polymer-dispersion comprising a polymeric stabiliser and also a cationic polyelectrolyte as co-stabiliser. U.S. Pat. No. 6,075,089 discloses a stabiliser which is a graft copolymer.

When preparing polymer dispersions according to above, stabilisers used in prior art processes have been ones prepared in advance. In, for example, WO 03/097703 A1 monomers are polymerised into a dispersed polymer in the presence of a pre-made stabiliser. Thus, the preparation of a stabiliser adds an extra step to the whole polymer dispersion preparation process, requiring time, equipment and leading to costs.

It is an object of the present invention to provide a process for preparing a polymer dispersion which can be made in few steps and in which the process viscosity is kept low and smooth during preparation without any large viscosity peaks, and which gives no deposits. There is a further object of the present invention to provide a polymer dispersion having high stability, comparatively low cationic charge, high active content without too high viscosity, and which at the same time gives good retention and dewatering when used in papermaking processes. There is also an object of the present invention to provide a polymeric stabiliser.

THE INVENTION

According to the invention it has surprisingly been found that a stable polymer dispersion having high active content of a dispersed polymer and low process viscosity can be achieved by a process for preparing an aqueous polymer dispersion according to the present invention. The process comprises reacting, in the presence of a polymeric cationic co-stabiliser (A), one or more monomers (m), and a polymer (B) of a monomer mixture comprising at least one monomer (x) having a primary, secondary or tertiary amine or amide group and at least one olefinic unsaturation, and, at least one cationic monomer (y) having at least one olefinic unsaturation, if a monomer having an amide group is used, the polymer has been hydrolysed to convert the amide functionality into an amine functionality.

By "stable polymer dispersion" is herein meant that there is suitably an even distribution of polymer particles in an aqueous solution having a shear viscosity at 1/s of below 10,000 mPa·s (Brookfield spindle 5). For being regarded as a "stable" dispersion, there should be less than about 5 weight % of sediment when centrifuging the dispersion at 3,000 rpm for 30 minutes, preferably less than about 1 weight %, calculated as based on dispersed polymer.

According to the invention there is also provided a polymer dispersion comprising: 1) a dispersed polymer comprising one or more monomer units originating from one or more monomers (m), and, 2) a polymeric cationic stabiliser (A) which is a polymer resulting from reaction of: a polymer of a monomer mixture comprising at least one monomer (x) having a primary, secondary or tertiary amine or amide group and at least one olefinic unsaturation, and, a cationic monomer (y) having at least one olefinic unsaturation, if a monomer having an amide group is used, the polymer has been hydrolysed to convert the amide functionality into an amine functionality, and, one or more monomers (m), and, 3) a polymeric cationic co-stabiliser (A). The polymer dispersion is suitably a water-soluble polymer dispersion.

The weight average molecular weight of the dispersed polymer is suitably from about 1,000,000 to about 15,000,000 g/mole, preferably from about 6,000,000 to about 9,000,000 g/mole.

According to the invention there is also provided a process for preparing a polymeric stabiliser (C) comprising: a) reacting a mixture comprising a cationic monomer (y) having at least one olefinic unsaturation and a monomer (x) having, a primary, secondary or tertiary amine or amide group and at least one olefinic unsaturation, forming an intermediate polymer (B), if a monomer having an amide group is used, the intermediate polymer (B) is hydrolysed to convert the amide functionality into an amine functionality, and then, b) reacting the intermediate polymer, in the presence of a polymeric cationic co-stabiliser, with one or more monomers (m), forming the polymeric stabiliser (C).

According to the invention there is also provided a polymeric stabiliser (C) being a graft copolymer, its backbone formed by monomers (y) and (x) and its grafted branches of monomer(s) (m). The grafted branches of the graft copolymer are suitably grafted onto monomer units (x). More specifically, the backbone of the polymeric stabiliser (C) comprises, in polymerised form, a cationic monomer (y) having at least one olefinic unsaturation and a monomer (x) having a primary, secondary or tertiary amine group and at least one olefinic unsaturation, its grafted branches comprising, in polymerised form, one or more monomers (m).

The aqueous polymer dispersion is suitably a salt-free dispersion. By "salt-free" is herein meant that no substantial amount of an inorganic salt, especially a polyvalent anionic inorganic salt, is present. By "no substantial amount" is herein suitably meant less than about 1 weight %, preferably less than about 0.5 weight %, most preferably less than about 0.1 weight %.

The Brookfield viscosity at 25° C. (spindle 5 at 1 s$^{-1}$) of the polymer dispersion is suitably from about 100 to about 10,000 mPas, preferably from about 500 to about 5,000 mPas, most preferably from about 1,000 to about 3,000 mPas.

The monomers, (m) preferably comprise a non-ionic monomer, ($m_1$), and a cationic monomer, ($m_2$). The non-ionic monomer, ($m_1$), is preferably a monomer of the general formula (I):

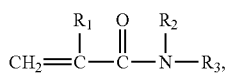

wherein $R_1$ is hydrogen or methyl, and $R_2$ and $R_3$ are, independently from each other, any of hydrogen, $C_1$-$C_2$ alkyl, isopropyl, methylol, hydroxyethyl, hydroxypropyl, or (trismethylol)methyl. The (non-ionic) monomer ($m_1$) is suitably acrylamide, methacrylamide, N-isopropylacrylamide, N-isopropylmethacrylamide, N-t-butylacrylamide, N-t-butylmethacrylamide, N-methylolacrylamide, or N-methylolmethacrylamide.

The cationic monomer, ($m_2$) is preferably a monomer of the general formula (II):

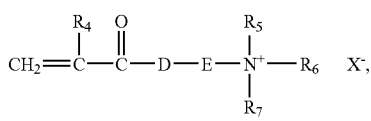

wherein $R_4$ is hydrogen or methyl, $R_5$, $R_6$ and $R_7$ are, independently from each other, any of hydrogen, $C_1$-$C_8$ alkyl or benzyl, D is oxygen or NH, E is $C_2$-$C_4$ alkyl or $C_2$-$C_4$ hydroxyalkyl, $X^-$ is an anionic counterion, suitably a monovalent anion, e.g. chloride. The cationic monomer ($m_2$) is suitably acryloyl-oxyethyl-trimethylammoniumchloride (ADAM), acryloyloxyethyl-benzyldimethyl-ammoniumchloride (ADAM BQ), methacryloyloxyethyl-trimethylammoniumchloride (MADAM), methacryloyl-oxyethyl-benzyldimethylammonium-chloride (MADAM BQ), acrylamidopropyl-trimethylammoniumchloride (TMA-PAA), acrylamidopropyl-benzyl-dimethylammoniumchloride (BDMAPAA), methacryl-amidopropyl-trimethylammoniumchloride (TMAPMA), or methacrylamidopropyl-benzyldimethylammoniumchloride (BDMAPMA).

The molar ratio between monomer ($m_1$) and monomer ($m_2$) is suitably from about 95:5 to about 50:50, preferably from about 92:8 to about 85:15.

The polymeric cationic co-stabiliser (A) is suitably a homo- or co-polymer of monomers $m_2$ of the general formula II. Examples of suitable co-stabilisers (A) are homo- and co-polymers of DADMAC, N-trimethylammoniumpropylacrylamide, acryloyloxyethyl-trimethyl-ammoniumchloride (ADAM MQ), acryloyloxyethyl-benzyl-dimethyl-ammoniumchloride (ADAM BQ), methacryloylethyltrimethylammoniumchloride (MADAM MQ), vinylbenzyl-trimethyl-ammoniumchlorid and vinylpyridine. Preferably, the co-stabiliser is a homopolymer of DADMAC or N-trimethyl-ammoniumpropyl-acrylamide, optionally in combination with non-ionic monomers such as (meth)acrylamide. Further examples of suitable co-stabilisers (A) are polyethylenimine, polyvinylamine and polyamines. The polymeric cationic co-stabiliser (A) suitably has a weight average molecular weight of from about 1,000 to about 500,000 g/mole, preferably from about 2,000 to about 100,000 g/mole, most preferably from about 3,000 to about 20,000 g/mole. The co-stabiliser can also be a mixture of different polymeric cationic co-stabilisers with the above-mentioned molecular weight.

The monomer (x) is suitably selected from monomers of the general formula (III):

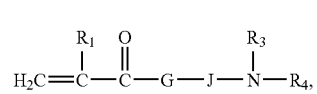

wherein $R_1$ is hydrogen or methyl, $R_3$ and $R_4$ are independently from each other hydrogen, $C_1$-$C_8$ alkyl, benzyl, alkylbenzyl, methylol, hydroxyethyl, 2-hydroxypropyl, or trismethylol, G is NH or oxygen, J is $C_1$-$C_{10}$ alkyl, $C_1$-$C_{10}$ hydroxyalkyl, or —$CH_2$—$CH_2$—O—)$_n$—$CH_2$—$CH_2$—, n=0, 1, 2, 3, . . . 10, or, the monomer (x) is selected from the group of methyldiallylamine, vinylpyridine, vinylimidazole, or vinylbenzyldimethylamine. Preferably, the monomer (x) is diallylamine, diallylpropanolamine, N-vinylformamide, N-methyl-N-vinylformamide, or N-methyl-N-vinylacetamide.

The weight ratio amine or amide monomer (x) to cationic monomer (y) is suitably from about 0.1:100 to about 50:100, preferably from about 3:100 to about 10:100.

The olefinic unsaturation in cationic monomer (y) is suitably an alpha olefinic unsaturation, Preferably, the olefinic unsaturation is present as a vinyl or allyl group. The cationic monomer (y) is suitably selected from the group of cationic monomers $m_2$ or from diallyldimethylammonium chloride, N-methylvinylpyridinium chloride, N-methyl-N-vinylimidazolinium chloride, N-vinylbenzyl-trimethylammonium chloride. Preferably, the cationic monomer (y) is diallyldimethylammoniumchloride (DADMAC), N-trimethylammoniumpropyl-acrylamide, or acryloyloxyethyl-trimethyl-ammoniumchloride.

The polymer dispersion may also comprise further stabilisers such as polymeric stabilisers, e.g. cationic polymers. These cationic polymers may be homo- or copolymers made up from at least one monomer belonging to the group of diallyldimethylammonium chloride (DADMAC), vinylpyridinium chloride, N-vinylimidazoline chloride, vinylbenzyltrimethylammonium chloride acryloyl-oxyethyl-trimethylammoniumchloride (ADAM-MQ), acryloyloxyethyl-benzyldimethyl-ammoniumchloride (ADAM-BQ), methacryloyloxyethyl-trimethylammoniumchloride (MADAM), methacryloyl-oxyethyl-benzyldimethyl-ammoniumchloride (MADAM-BQ), acrylamidopropyltrimethyl-ammoniumchloride (TMAPAA), acrylamidopropyl-benzyl-dimethylammoniumchloride (BDMAPAA), methacryl-amidopropyl-trimethylammonium-chloride (TMAPMA), and methacrylamidopropyl-benzyldimethylammoniumchloride (BDMAPMA). Optionally, a further co-monomer can, for example, be a PEG acrylate or a block copolyether as described in WO 03/097703.

As polymerization initiators organic azo compounds, organic peroxides, inorganic peroxidisulfates, hydrogen peroxide or redox initiators may be used. Preferably, cationic azo compounds or inorganic peroxidisulfates are used.

The invention also relates to the use of the aqueous polymer dispersion herein described as retention and dewatering aid in paper manufacturing, as thickening agent and/or as soil improvement agent.

In a preferred embodiment of the invention, a copolymer of diallyl-dimethylammoniumchloride (DADMAC) and an amine monomer which is diallyl amine (DAA), or diallyl-2-propanolamine (DAPA) is made. A polymer dispersion is made by reacting the copolymer made with acrylamide and acryloxyethyl-dimethylbenzylammoniumchloride (ADAM BQ) in the presence of a DADMAC homopolymer.

Finally, the present invention relates to a process for the production of paper from an aqueous suspension containing cellulosic fibres, and optional fillers, which comprises adding to the suspension an aqueous polymer dispersion as described herein, forming and draining the suspension on a wire.

EXAMPLES

Example 1

A diallyl-dimethylammoniumchloride (DADMAC) copolymer with 10 mole % diallyl-2-propanolamine (DAPA) was prepared in a lab-reactor by polymerising a mixture of 330 g of 65 weight % aqueous DADMAC solution, 24.1 g DAPA, 16.2 g hydrochloric acid (37 weight %) and 700 g additional water. The pH was adjusted with sodium hydroxide to about 4. The mixture was stirred at room temperature for 30 minutes along with nitrogen purge and then added with 4.3 g azo-initiator (V-50) dissolved in 25 ml water. The temperature was raised to about 50° C. and the polymerisation continued for 6 hours. Finally, 6.58 g sodium hydroxide dissolved in 150 ml water was added. A DADMAC copolymer having a weight average molecular weight of 55,000 Dalton determined by GPC was achieved.

Example 2

A diallyl-dimethylammoniumchloride (DADMAC) copolymer with 3 mole % diallylamine (DAA) was prepared in a lab-reactor by polymerising a mixture of 1603 g of a 65 weight % aqueous DADMAC solution, 19.76 g DAA, 20.1 g hydrochloric acid (37 weight %) and 30 g of 1 weight % EDTA solution. The pH was adjusted with sodium hydroxide to about 4. The mixture was stirred at room temperature for 30 minutes along with nitrogen purge and then added during three hours with 3.5 g azo-initiator (V-50) dissolved in 60 ml water. The temperature was raised to about 50° C. and the polymerisation continued for 22 hours. Next day 200 ml water was added and 5.25 g azo-initiator (V-50) dissolved in 70 ml water was added. The temperature was raised to 60° C. and the polymerisation continued for 24 hours. The third day another 200 ml of water was added and 4.0 g azo-initiator (V-50) dissolved in 60 ml water was added. The temperature was kept at 60° C. and the polymerisation continued for 24 hours. A DADMAC copolymer having a weight average molecular weight of 190,000 Dalton determined by GPC was achieved.

Example 3

A diallyl-dimethylammoniumchloride (DADMAC) copolymer with 10 mole % diallylamine (DAA) was also prepared in a lab-reactor by polymerising a mixture of 1092 g of a 65 weight % aqueous DADMAC solution, 45.4 g DAA, 49.9 g hydrochloric acid (37 weight %) and 30 g of 1 weight % EDTA solution. The pH was adjusted with sodium hydroxide to about 4. The mixture was stirred at room temperature for 30 minutes along with nitrogen purge and then added during five hours with 3.5 g azo-initiator (V-50) dissolved in 60 ml water. The temperature was raised to about 50° C. and the polymerisation continued for 22 hours. Next day 400 ml water was added and 2.6 g azo-initiator (V-50) dissolved in 35 ml water was added. The temperature was raised to 60° C. and after two hours another 2.6 g azo-initiator (V-50) dissolved in 35 ml water was added. After viscosity increase 200 ml water was added and the polymerisation was continued for 24 hours. The third day the temperature was raised to 80° C. and 585 ml water was added. 3.5 g azo-initiator (V-50) dissolved in 60 ml water was added. At the end of the third day the mixture was cooled down. A DADMAC copolymer having a weight average molecular weight of 230,000 Dalton determined by GPC was achieved.

Examples 4-6

Polymer dispersions were prepared by polymerising monomer mixtures comprising acrylamide (AAm) and acryloxyethyl-dimethylbenzylammoniumchloride (ADAM BQ), in the presence of one of the DADMAC copolymer prepared in Examples 1-3.

Three mixtures were made each containing 7.1 crystalline AAm, 2.96 g (80 weight %) ADAM BQ, 3.0 g DADMAC copolymer made in Examples 1, 2 or 3, 10 g polyDADMAC (40 weight %) and 0.15 g hydrogen peroxide or 0.2 g sodium persulphate. Water was added up to 100 g and the reaction was allowed for some hours at 60° C. while stirring.

Table 1 describes the dispersions according to examples. The viscosity was low for all dispersions. The dispersions were stable, i.e., no visible sedimentation when centrifuged for 30 minutes at 3000 rpm.

Application tests regarding retention and dewatering in papermaking processes were made by means of a Dynamic Drainage Analyser (DDA) available from Akribi, Sweden. The furnish used was based on 70% by weight of bleached pulp and 30% by weight of clay. The stock volume was 800 ml, the pulp concentration 4 g/L and the conductivity 1.5 mS/cm. The stock was stirred at a speed of 1500 rpm while the following was added to the stock: an anionic trash catcher (0.5 kg/t), polymer dispersion (1.0 kg/t) and finally anionic inorganic particles (0.5 kg/t). The temperature was 22.5° C. A vacuum of 0.35 bar was used for the analysis. The retention time (s) and turbidity (NTU) was measured.

TABLE 1

Polymer dispersions and application tests

| Example | DADMAC copolymer | Viscosity (mPas) | Polymer load (kg/t) | Retention time (s) | Turbidity (NTU) |
|---|---|---|---|---|---|
| 4 | Ex. 1 (10% DAPA) | 1000-1500 | 1.0 | 30.8 | 82 |
| 5 | Ex. 2 (3% DAA) | 1000-1500 | 1.0 | 31.5 | 77 |
| 6 | Ex. 3 (10% DAA) | 1000-1500 | 1.0 | 29.4 | 75 |

It is concluded that the dispersions using dispersants according to the invention show good results in retention and dewatering.

The invention claimed is:

1. A polymer dispersion comprising:
    a) a dispersed polymer consisting of monomer units originating from one or more monomers (m), and,
    b) a polymeric stabiliser (C) which is a graft copolymer resulting from reaction of:
        i) a polymer (B) of a monomer mixture comprising monomers selected from the group consisting of one monomer (x) having a primary, secondary or tertiary amine or amide group and at least one olefinic unsaturation, and, a cationic monomer (y) having at least one olefinic unsaturation, if a monomer having an amide group is used, the polymer has been hydrolysed to convert the amide functionality into an amine functionality, and,
        ii) said one or more monomers (m),
    polymer (B) constituting the backbone of the polymeric stabiliser (C), and monomers (m) the grafted branches, and,
    c) a polymeric cationic co-stabiliser (A) being a homo- or co-polymer consisting of monomers $m_2$ of general formula (II),
    wherein the monomers, (m), consist of a non-ionic monomer, ($m_1$), and a cationic monomer, ($m_2$), wherein the non-ionic monomer, ($m_1$), is N-t-butylacrylamide, N-t-butylmethacrylamide or a monomer of the general formula (I):

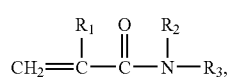

wherein $R_1$ is hydrogen or methyl, and $R_2$ and $R_3$ are, independently from each other, any of hydrogen, $C_1$-$C_2$ alkyl, isopropyl, methylol, hydroxyethyl, or hydroxypropyl;

wherein the cationic monomer, ($m_2$), is a monomer of the general formula (II):

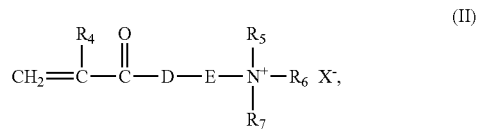

wherein $R_4$ is hydrogen or methyl, $R_5$, $R_6$ and $R_7$ are, independently from each other, any of hydrogen, $C_1$-$C_8$ alkyl or benzyl, D is oxygen or NH, E is $C_2$-$C_4$ alkyl or $C_2$-$C_4$ hydroxyalkyl, $X^-$ is an anionic counterion; and wherein the amine or amide monomer (x) selected from the group consisting of diallylamine, methdiallylamine, diallylpropanolamine, N-vinylformamide, N-methyl-N-vinylformamide, and N-methyl-N-vinylacetamide.

2. The polymer dispersion according to claim 1, wherein the non-ionic monomer ($m_1$) is selected from the group consisting of acrylamide, methacrylamide, N-isopropylacrylamide, N-isopropylmethacrylamide, N-methylolacrylamide, and N-methylolmethacrylamide.

3. The polymer dispersion according to claim 1, wherein the cationic monomer ($m_2$) is selected from the group consisting of acryloyl-oxyethyl-trimethylammoniumchloride (ADAM), acryloyloxyethyl-benzyldimethyl-ammoniumchloride (ADAMBQ), methacryloyl-oxyethyl-trimethylammoniumchloride (MADAM), methacryloyl-oxyethyl-benzyldimethyl-ammoniumchloride (MADAMBQ), acrylamidopropyl-trimethylammoniumchloride (TMA-PAA), acrylamidopropyl-benzyl-dimethylammoniumchloride (BDMAPAA), methacryl-amidopropyl-trimethylammonium-chloride (TMAPMA), and methacrylamidopropyl-benzyl-dimethylammoniumchloride (BDMAPMA).

4. The polymer dispersion according to claim 1, wherein the amine or amide monomer (x) is selected from the group consisting of diallylamine and diallylpropanolamine.

5. The polymer dispersion according to claim 1, wherein the cationic monomer (y) is diallyldimethylammoniumchloride (DADMAC).

6. The polymer dispersion according to claim 1, wherein the polymeric cationic co-stabiliser (A) is poly-DADMAC homopolymer.

7. The polymer dispersion according to claim 1, wherein (m1) is a non-ionic acrylamide monomer and (m2) is a cationic acryloxyethyldimethylbenzylammoniumchloride (ADAM BQ) monomer; monomer (x) is a diallylamine or diallylpropanolamine, and cationic monomer (y) is a diallyldimethylammoniumchloride (DADMAC); and the polymeric cationic co-stabilise (A) is a poly-DADMAC homopolymer.

8. The polymer dispersion according to claim 1, wherein cationic monomer (y) is selected from the group of cationic monomers $m_2$ or from diallyldimethylammonium chloride, N-methylvinylpyridinium chloride, N-methyl-N-inylimidazolinium chloride, N-vinylbenzyl-trimethylammonium chloride.

9. A polymer dispersion comprising:
    a) a dispersed polymer consisting of monomer units originating from one or more monomers (m), and,
    b) a polymeric stabilizer (C) which is a graft copolymer resulting from reaction of:
    i) a polymer (B) of a monomer mixture comprising monomers selected from the group consisting of one monomer (x) having a primary, secondary or tertiary amine or amide group and at least one olefinic unsaturation, and, a cationic monomer (y) being a diallyldimethylammoniumchloride (DADMAC), and, ii) said one or more monomers (m), polymer (B) constituting the backbone of the polymeric stabiliser (C) and monomers (m) the grafted branches; and, c) a polymeric cationic co-stabiliser (A) being a poly-DADMAC homopolymer, wherein the monomers, (m), consist of a non-ionic monomer, ($m_1$), and a cationic monomer, ($m_2$), wherein the non-ionic monomer, ($m_1$), is N-t-butylacrylamide, N-t-butylmethacrylamide or a monomer of the general formula (I):

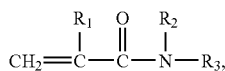

wherein $R_1$ is hydrogen or methyl, and $R_2$ and $R_3$ are, independently from each other, any of hydrogen, $C_1$-$C_2$ alkyl, isopropyl, methylol, hydroxyethyl, or hydroxypropyl;

wherein the cationic monomer, ($m_2$), is a monomer of the general formula (II):

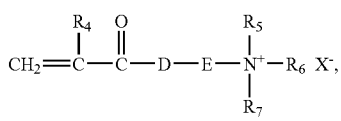

wherein $R_4$ is hydrogen or methyl, $R_5$, $R_6$ and $R_7$ are, independently from each other, any of hydrogen, $C_1$-$C_8$ alkyl or benzyl, D is oxygen or NH, E is $C_2$-$C_4$ alkyl or $C_2$-$C_4$ hydroxyalkyl, $X^-$ is an anionic counterion;

wherein the amine or amide monomer (x) is selected from the group consisting of diallylamine, diallylpropanolamine, N-vinylformamide, N-methyl-N-vinylformamide, and N-methyl-N-vinylacetamide.

10. The polymer dispersion according to claim 9, wherein the non-ionic monomer ($m_1$) is selected from the group consisting of acrylamide, methacrylamide, N-isopropylacrylamide, N-isopropylmethacrylamide, N-methylolacrylamide, and N-methylolmethacrylamide.

11. The polymer dispersion according to claim 9, wherein the cationic monomer ($m_2$) is selected from the group consisting of acryloyl-oxyethyl-trimethylammoniumchloride (ADAM), acryloyloxyethyl-benzyldimethyl-ammoniumchloride (ADAMBQ), methacryloyl-oxyethyl-trimethylammoniumchloride (MADAM), methacryloyl-oxyethyl-benzyldimethyl-ammoniumchloride (MADAMBQ), acrylamidopropyl-trimethylammoniumchloride (TMAPAA), acrylamidopropyl-benzyl-dimethylammoniumchloride (BDMAPAA), methacryl-amidopropyl-trimethylammonium-chloride (TMAPMA), and methacrylamidopropyl-benzyl-dimethylammoniumchloride (BDMAPMA).

12. The polymer dispersion according to claim 9 wherein ($m_1$) is a non-ionic acrylamide monomer and ($m_2$) is a cationic acryloxyethyldimethylbenzylammoniumchloride (ADAM BQ) monomer; monomer (x) is a diallylamine or diallylpropanolamine, and cationic monomer (y) is a diallyldimethylammoniumchloride (DADMAC).

13. A Process for preparing a polymer dispersion comprising reacting, in the presence of a polymeric cationic co-stabiliser (A), one or more-monomers (m), and a polymer (B) of a monomer mixture comprising monomers selected from the group consisting of one monomer (x) having a primary, secondary or tertiary amine or amide group and at least one olefinic unsaturation, and, one cationic monomer (y) having at least one olefinic unsaturation, if a monomer having an amide group is used, the polymer has been hydrolysed to convert the amide functionality into an amine functionality;

wherein the reacting step occurs under conditions that result in the formation of a polymeric stabilizer (C), which is a graft copolymer;

wherein polymer (B) constitutes the backbone of the polymeric stabiliser (C) and monomers (m) the grafted branches, wherein the polymeric cationic co-stabiliser (A) is a homo- or co-polymer consisting of monomers $m_2$ of general formula (II), wherein the monomers, (m), consist of a non-ionic monomer, ($m_1$), and a cationic monomer, ($m_2$), wherein the non-ionic monomer, ($m_1$), is N-t-butylacrylamide N-t-butylmethacrylamide or a monomer of the general formula (I):

wherein $R_1$ is hydrogen or methyl, and $R_2$ and $R_3$ are, independently from each other, any of hydrogen, $C_1$-$C_2$ alkyl, isopropyl, methylol, hydroxyethyl, or hydroxypropyl;

wherein the cationic monomer, ($m_2$), is a monomer of the general formula (II):

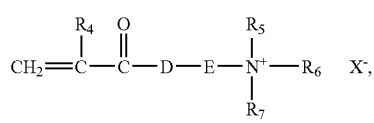

wherein $R_4$ is hydrogen or methyl, $R_5$, $R_6$ and $R_7$ are, independently from each other, any of hydrogen, $C_1$-$C_8$ alkyl or benzyl, D is oxygen or NH, E is $C_2$-$C_4$ alkyl or $C_2$-$C_4$ hydroxyalkyl, $X^-$ is an anionic counterion; and wherein the amine or amide monomer (x) selected from the group consisting of diallylamine, methdiallylamine, diallylpropanolamine, N-vinylformamide, N-methyl-N-vinylformamide, and N-methyl-N-vinylacetamide.

14. The Process according to claim 13, wherein the monomers, (m), consist of a non-ionic monomer, ($m_1$), and a catonic monomer, ($m_2$).

15. The Process according to claim 14, wherein the non-ionic monomer, ($m_1$), is a monomer of the general formula (I):

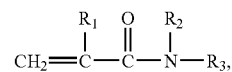

wherein $R_1$ is hydrogen or methyl, and $R_2$ and $R_3$ are, independently from each other, any of hydrogen, $C_1$-$C_2$ alkyl, isopropyl, methylol, hydroxyethyl, or hydroxypropyl.

16. The Process according to claim 14, wherein the cationic monomer, ($m_2$), is a monomer of the general formula (II):

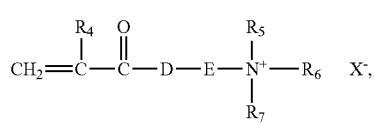

wherein $R_4$ is hydrogen or methyl, $R_5$, $R_6$ and $R_7$ are, independently from each other, any of hydrogen, $C_1$-$C_8$ alkyl or benzyl, D is oxygen, or NH, E is $C_2$-$C_4$ alkyl or $C_2$-$C_4$ hydroxyalkyl, $X^-$ is an anionic counterion.

17. The Process according to claim 14, wherein the amine or amide monomer (x) is a monomer of the general formula (III):

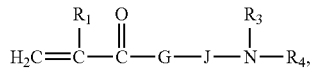
(III)

wherein $R_1$ is hydrogen or methyl, $R_3$ and $R_4$ are independently from each other hydrogen, $C_1$-$C_8$ alkyl, benzyl, alkylbenzyl, methyloyl, hydroxyethyl, 2-hydroxypropyl, or trismethylol, G is NH or oxygen, J is $C_1$-$C_{10}$ alkyl, $C_1$-$C_{10}$ hydroxyalkyl, or —($CH_2$—$CH_2$—O—)$_n$—$CH_2$—$CH_2$—, n=0, 1, 2, 3, ... 10, or, the amine or amide monomer (x) is selected from the group of monomers methyldiallylamine, vinylpyridine, vinylimidazole, or vinylbenzyldimethylamine.

18. A process for the production of paper from an aqueous suspension containing cellulosic fibres, and optional fillers, which comprises adding to the suspension a polymer dispersion according to claim 1, forming and draining the suspension on a wire.

* * * * *